US008152675B2

(12) United States Patent
Altvaten et al.

(10) Patent No.: US 8,152,675 B2
(45) Date of Patent: Apr. 10, 2012

(54) DEVICE FOR OPTIMIZING THE FEED FUNCTION OF THE RING GEAR OF A DIFFERENTIAL WITH REGARD TO THE MAXIMUM FLOW RATE

(75) Inventors: Roland Altvaten, Friedrichshafen (DE); Sven Jabs, Weingarten (DE); Martin Gluck, Brandenburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 464 days.

(21) Appl. No.: 12/442,429

(22) PCT Filed: Sep. 3, 2007

(86) PCT No.: PCT/EP2007/059178
§ 371 (c)(1),
(2), (4) Date: Mar. 23, 2009

(87) PCT Pub. No.: WO2008/037565
PCT Pub. Date: Apr. 3, 2008

(65) Prior Publication Data
US 2010/0009800 A1    Jan. 14, 2010

(30) Foreign Application Priority Data
Sep. 26, 2006  (DE) .......................... 10 2006 045 239

(51) Int. Cl.
*F16H 57/04*     (2010.01)
*F01M 1/00*      (2006.01)
*F01M 9/06*      (2006.01)

(52) U.S. Cl. ...... 475/160; 475/159; 184/6.12; 184/11.1; 184/13.1

(58) Field of Classification Search ................... 475/159, 475/160; 184/6.12, 11.1, 13.1
See application file for complete search history.

(56) References Cited

U.S. PATENT DOCUMENTS

| 2,147,144 | A | * | 2/1939 | Carlson et al. | ............... 184/11.1 |
| 2,147,145 | A | * | 2/1939 | Carlson et al. | ............... 184/11.2 |
| 2,182,889 | A | * | 12/1939 | Carlson et al. | ............... 184/11.1 |
| 2,191,833 | A | * | 2/1940 | Russell | ........................ 184/11.1 |
| 3,788,426 | A | * | 1/1974 | Hull, Jr. | ......................... 184/109 |
| 4,271,717 | A | * | 6/1981 | Millward et al. | ................ 74/467 |
| 4,693,133 | A | | 9/1987 | Tomita et al. | |
| 5,505,112 | A | | 4/1996 | Gee | |
| 6,523,435 | B2 | | 2/2003 | Ruehle et al. | |
| 6,843,746 | B2 | * | 1/2005 | Hayes et al. | ................... 475/160 |
| 8,021,259 | B2 | * | 9/2011 | Hilker et al. | ................... 475/160 |

FOREIGN PATENT DOCUMENTS

| DE | 19833536 A1 | 1/2000 |
| DE | 10020079 C1 | 10/2001 |
| DE | 10162864 A1 | 7/2003 |

* cited by examiner

Primary Examiner — Tisha Lewis
(74) Attorney, Agent, or Firm — Davis & Bujold PLLC

(57) ABSTRACT

A device for optimizing the oil delivery function of the ring gear of a differential to maximize the volume of oil flow. The device includes an annular disk (6) which, when viewed in an axially direction, is arranged adjacent the ring gear (1) on the side of the ring gear (1) facing the differential cage (5) and is coaxial with the ring gear (1). The annular disk (6) also serves as a scraper ring.

7 Claims, 2 Drawing Sheets

DEVICE FOR OPTIMIZING THE FEED FUNCTION OF THE RING GEAR OF A DIFFERENTIAL WITH REGARD TO THE MAXIMUM FLOW RATE

This application is a National Stage completion of PCT/EP2007/059178 filed Sep. 3, 2007, which claims priority from German patent application serial no. 10 2006 045 239.9 filed Sep. 23, 2006.

FIELD OF THE INVENTION

The present invention relates to a device for optimizing the delivery function of the ring gear of a differential in relation to maximum volume flow.

BACKGROUND OF THE INVENTION

From the prior art it is known to make use of the pump action of the ring gear in differentials with integrated axle drive for circulating the oil volume. In this, the oil is entrained by the teeth of the ring gear in the circumferential direction and carried away with the assumed speed of the ring gear. Thus, an oil flow is formed around the rotating ring gear, but owing to the open structure of a differential this flow is turbulent, so the useful quantity of oil delivered is considerably reduced in a disadvantageous manner; from the prior art no specific way is known of optimizing the delivery function of the ring gear to maximum the flow volume.

SUMMARY OF THE INVENTION

The purpose of the present invention is to provide a device for optimizing the delivery function of the ring gear of a differential in relation to maximum volume flow, by virtue of which the useful quantity of oil delivered is greater when compared with designs known from the prior art.

Accordingly, a device for optimizing the delivery function of the ring gear of a differential in relation to maximum volume flow is proposed, comprising an annular disk which, viewed axially, is arranged next to the ring gear on the side of the latter facing toward the differential cage and coaxially with the ring gear, and which serves as a scraper ring. According to an advantageous further development of the invention, the dimensions of the annular ring are such that with its outside radial perimeter it forms a seal against the differential cover.

In addition, in accordance with the invention it can be provided that the inside radial perimeter of the annular disk is as small a distance as possible away from the ring gear and the differential cage in the axial and radial direction.

By virtue of the concept of the invention, the oil entrained by the teeth of the ring gear in the circumferential direction encounters a barrier which prevents spreading out of the oil flow or oil ring around the ring gear, whereby the delivery function of the ring gear is optimized in relation to maximum volume flow.

BRIEF DESCRIPTION OF THE DRAWINGS

Below, the invention is explained in more detail with reference to the attached figures, which show.

DETAILED DESCRIPTION OF THE PREFERRED EMBODIMENTS

Figure 1:
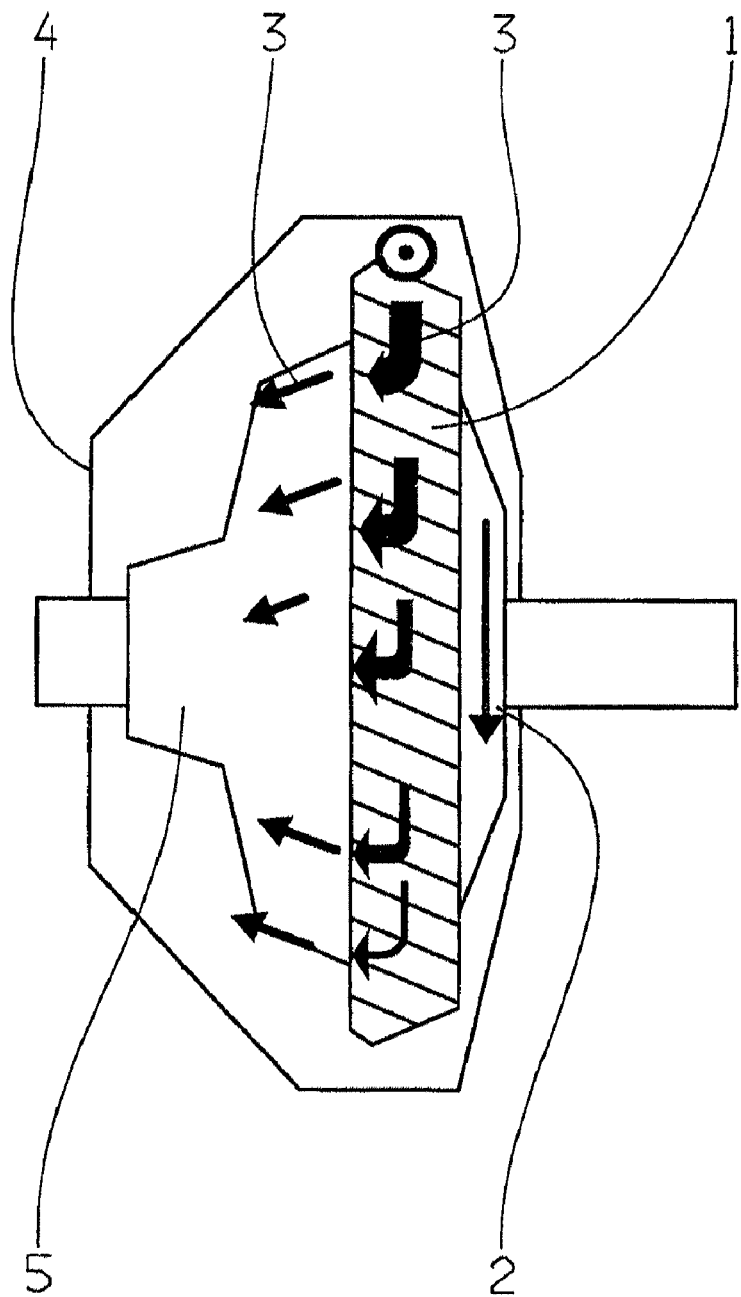
FIG. 1: Schematic sectional view of a ring gear of a differential arranged in a differential cage, without the device according to the invention for deflecting splashed oil, and representation of the flow situation produced when the ring gear is rotating.

FIG. 1 shows a differential comprising a ring gear 1, which rotates in the direction indicated by the arrow 2. The figure shows the differential cage and the differential cover, indexed 5 and 4 respectively. Owing to the rotary movement of the ring gear 1 oil is entrained by the teeth of the ring gear in the circumferential direction and carried away at the speed of the ring gear 1. The oil flow produced thereby is indicated in the figure by the arrows 3. As can be seen from the figure, as a result of the open structure of the differential the oil flow is turbulent, which considerably reduces the useful quantity delivered.

To overcome this problem, according to the invention it is proposed to fit an annular disk 6 which, viewed axially, is next to the ring gear 1 on the side of the latter facing toward the differential cage 5 and is coaxial with it, as near to it as possible, the disk serving as a scraper ring which, at its outside radial perimeter 7, forms a seal against the differential cover.

Figure 2:
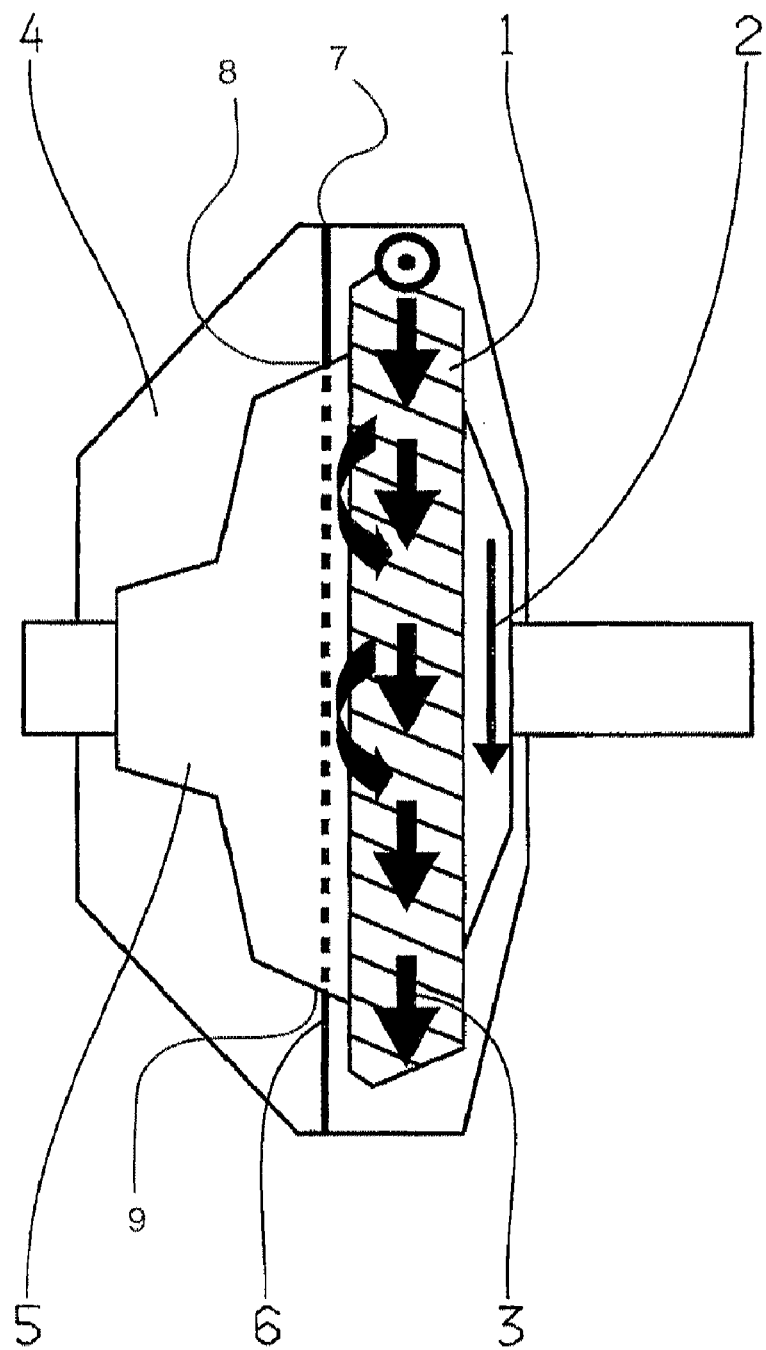
FIG. 2: Schematic sectional view of a ring gear of a differential arranged in a differential cage, comprising the device according to the invention for deflecting splashed oil, and representation of the flow situation produced when the ring gear is rotating.

According to the invention the inside radial perimeter 8 of the annular disk 6 is as small a distance as possible away from the ring gear 1 and adjacent an outer radial perimeter (9) the differential cage 5 in the axial and radial direction. Thanks to the concept according to the invention the oil entrained by the teeth of the ring gear in the circumferential direction encounters a barrier which prevents the oil flow or oil ring around the ring gear from spreading out, and this optimizes the delivery function of the ring gear 1 in relation to maximum volume flow. The optimized oil flow is represented in FIG. 2 by the arrows 3.

The concept upon which the invention is based is not limited to a ring gear in a differential. Rather, an annular disk arranged coaxially with a gearwheel can also be used to deflect oil splashed from rotating wheels in an oil sump if the design particulars make this possible.

INDEXES

1 Ring gear
2 Rotation direction of the ring gear
3 Oil flow
4 Differential cover
5 Differential cage
6 Annular disk

The invention claimed is:

1. A device for optimizing an oil delivery function of a ring gear of a differential to maximize a volume of oil flow, the device comprising:
   an annular disk (6) which, when viewed axially, being located adjacent the ring gear (1) on a side of the ring gear (1) facing toward a differential cage (5) and being coaxial with the ring gear (1);
   the annular disk (6) serving as a scraper ring;
   the annular disk (6) having a larger diameter than the ring gear (1); and
   an outside radial perimeter (7) of the annular disk (6) being connected to and forming a seal with a differential cover (4).

2. A device for optimizing an oil delivery function of a ring gear of a differential to maximize a volume of oil flow, the device comprising:

an annular disk (6) which, when viewed axially, is located adjacent the ring gear (1) on a side of the ring gear (1) facing toward a differential cage (5) and is coaxial with the ring gear (1);

the annular disk (6) serving as a scraper ring;

an outside radial perimeter (7) of the annular disk (6) forms a seal with a differential cover (4); and an inside radial perimeter (8) of the annular disk (6) is located as close as possible to the ring gear (1) and the differential cage (5), in the axial direction and in a radial direction, so that oil entrained by teeth of the ring gear (1), in a circumferential direction, encounters a barrier which prevents one of oil flow or an oil ring around the ring gear from spreading out, such that the oil delivery function of the ring gear (1) is optimized in relation to the maximum volume of oil flow.

3. A device for maximizing a volume of oil flow within a differential, the device comprising:

an annular disk (6) which is axially located closely adjacent a differential ring gear (1), the annular disk (6) being located on a side of the differential ring gear (1) facing a differential cage (5), and the annular disk (6) and the differential ring gear (1) are coaxial with one another;

an outer radial perimeter (7) of the annular disk (6) being connected with a differential cover (4) so as to form a seal therebetween; and an inner radial perimeter (8) of the annular disk (6) being located radially closely adjacent an outer radial perimeter (9) of the differential cage (5), which extends slightly axially through the inner radial perimeter (8) of the annular disk (6).

4. The device for optimizing the oil delivery function of the ring gear according to claim 1, wherein a diameter of the ring gear (1) is larger than the outer radial perimeter (9) of the differential cage (5).

5. The device for optimizing the oil delivery function of the ring gear according to claim 1, wherein an inner radial perimeter (8) of the annular disk (6) is located radially closely adjacent to and forms a seal with an outer radial perimeter (9) of the differential cage (5).

6. The device for optimizing the oil delivery function of the ring gear according to claim 3, wherein a diameter of the ring gear (1) is larger than the outer radial perimeter (9) of the differential cage (5).

7. The device for optimizing the oil delivery function of the ring gear according to claim 3, wherein the inner radial perimeter (8) of the annular disk (6) forms a seal with the outer radial perimeter (9) of the differential cage (5).

* * * * *